(12) United States Patent
Bykovskyi et al.

(10) Patent No.: US 12,728,691 B2
(45) Date of Patent: Sep. 8, 2026

(54) AERODYNAMIC TRAILER

(71) Applicant: STI Holdings, Inc., Stoughton, WI (US)

(72) Inventors: Denys Bykovskyi, Madison, WI (US); Kenneth Roloff, Stoughton, WI (US); Gary Lynn Fenton, Edgerton, WI (US)

(73) Assignee: STI Holdings, Inc., Stoughton, WI (US)

( * ) Notice: Subject to any disclaimer, the term of this patent is extended or adjusted under 35 U.S.C. 154(b) by 0 days.

(21) Appl. No.: 18/667,859

(22) Filed: May 17, 2024

(65) Prior Publication Data

US 2024/0391288 A1 Nov. 28, 2024

Related U.S. Application Data

(60) Provisional application No. 63/504,137, filed on May 24, 2023.

(51) Int. Cl.
*B60G 21/00* (2006.01)
*B60G 5/00* (2006.01)

(52) U.S. Cl.
CPC .......... *B60G 21/007* (2013.01); *B60G 5/005* (2013.01)

(58) Field of Classification Search
CPC .. B60G 21/007; B60G 5/005; B60G 2200/31; B60G 2202/112; B60G 2204/15; B60G 2204/4232; B60G 2300/042; B60G 2300/40; B62D 35/001; B62D 53/062
See application file for complete search history.

(56) References Cited

U.S. PATENT DOCUMENTS

| | | | | |
|---|---|---|---|---|
| 3,743,044 A * | 7/1973 | Scheele | B60K 17/36 180/41 |
| 4,568,094 A | 2/1986 | Lovell | |
| RE32,736 E * | 8/1988 | Lovell | B60G 5/00 180/41 |
| 5,040,826 A | 8/1991 | Lovell | |
| 8,573,680 B2 | 11/2013 | Smith | |
| 9,352,714 B2 | 5/2016 | Batzer et al. | |
| 9,694,644 B2 | 7/2017 | Czlapinski | |
| 10,787,200 B1 | 9/2020 | Smith, Jr. et al. | |
| 11,518,452 B2 | 12/2022 | Schutt et al. | |
| 2020/0398628 A1 | 12/2020 | Schardt et al. | |

* cited by examiner

*Primary Examiner* — Jason D Shanske
*Assistant Examiner* — Joselynn Y Sliteris
(74) *Attorney, Agent, or Firm* — Michael Best & Friedrich LLP

(57) ABSTRACT

A trailer includes a cargo box having a forward end, a rearward end, and a flat floor extending between the forward end and the rearward end. A slider mechanism is coupled beneath the rearward end of the cargo box. A suspension assembly is movably coupled to the slider mechanism and configured to support the cargo box. The suspension assembly is movable along the slider mechanism between an operating position and a docking position. An operating height of the cargo box, when the suspension assembly is in the operating position, is lower than a docking height of the cargo box, when the suspension assembly is in the docking position.

16 Claims, 7 Drawing Sheets

62
122
118
130
134
138
122
134
138
134
138
126
118
134

AERODYNAMIC TRAILER

CROSS-REFERENCE TO RELATED APPLICATIONS

This application claims priority to U.S. Provisional Patent Application No. 63/504,137, filed on May 24, 2023, the entire contents of which are incorporated herein by reference.

BACKGROUND

The invention relates to over-the-road trailers, and in particular, to increasing aerodynamic efficiency thereof during operation.

SUMMARY

In one aspect, a trailer includes a cargo box having a forward end, a rearward end, and a flat floor extending between the forward end and the rearward end. A slider mechanism is coupled beneath the rearward end of the cargo box. A suspension assembly is movably coupled to the slider mechanism and configured to support the cargo box. The suspension assembly is movable along the slider mechanism between an operating position and a docking position. An operating height of the cargo box, when the suspension assembly is in the operating position, is lower than a docking height of the cargo box, when the suspension assembly is in the docking position.

In another aspect, a trailer includes a cargo box having a forward end, a rearward end, and a floor. A suspension assembly is coupled beneath the rearward end of the cargo box and to a plurality of tires. The suspension assembly is configured to support the cargo box via the tires. A slider mechanism is disposed between the suspension assembly and the cargo box. The slider mechanism includes a rail assembly coupled to and extending along the cargo box, and a box assembly slidably coupled to the rail assembly. The rail assembly includes a wedge such that a height of the rail assembly increases toward the rearward end of the cargo box. The box assembly supports the suspension assembly and is movable along the rail between an operating position and a docking position. An operating height of the cargo box, when the suspension assembly is in the operating position, is lower than a docking height of the cargo box, when the suspension assembly is in the docking position.

In yet another aspect, a trailer includes a cargo box having a forward end, a rearward end, and a floor extending between the forward end and the rearward end. A slider mechanism is coupled beneath the rearward end of the cargo box. A suspension assembly is movably coupled to the slider mechanism and configured to support the cargo box. The suspension assembly is movable along the slider mechanism between an operating position and a docking position. An operating height of the cargo box, when the suspension assembly is in the operating position, is lower than a docking height of the cargo box, when the suspension assembly is in the docking position. The floor is configured to maintain a level orientation when the cargo box is at the operating height.

DETAILED DESCRIPTION

Figure 1:
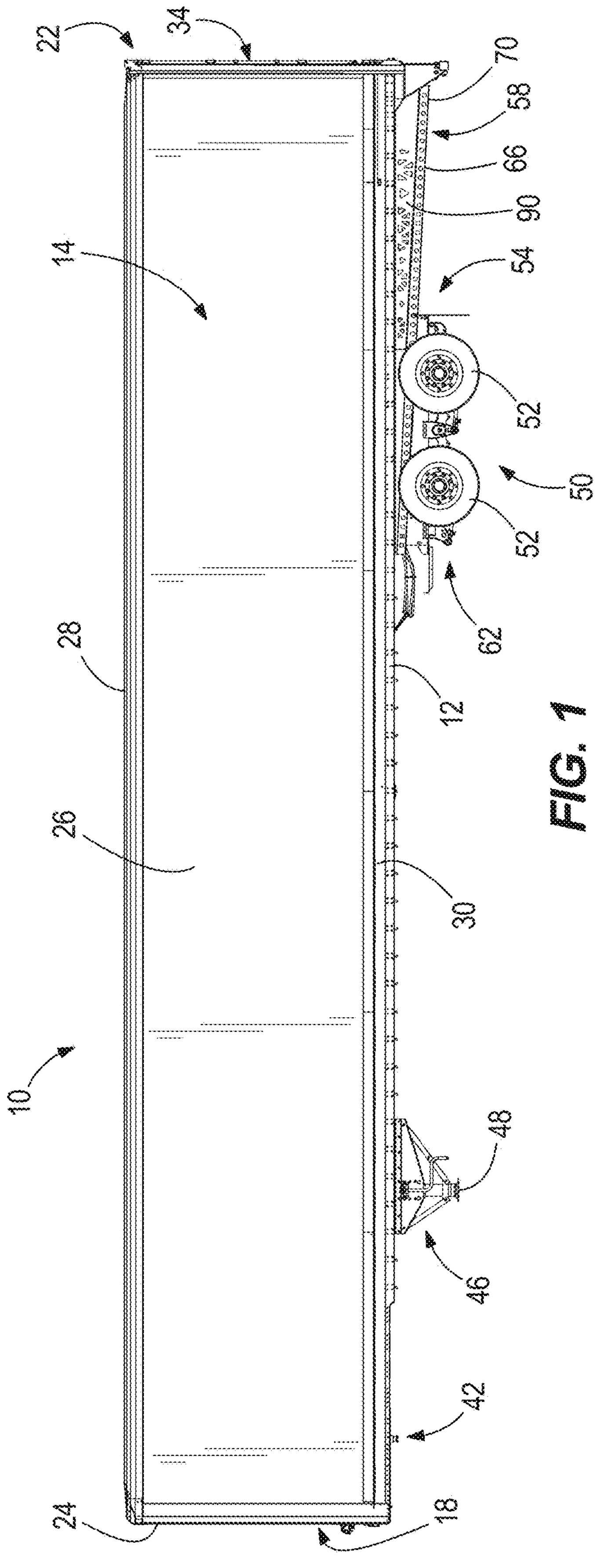
FIG. 1 is side view of a trailer according to an embodiment of the present disclosure.
Figure 2:
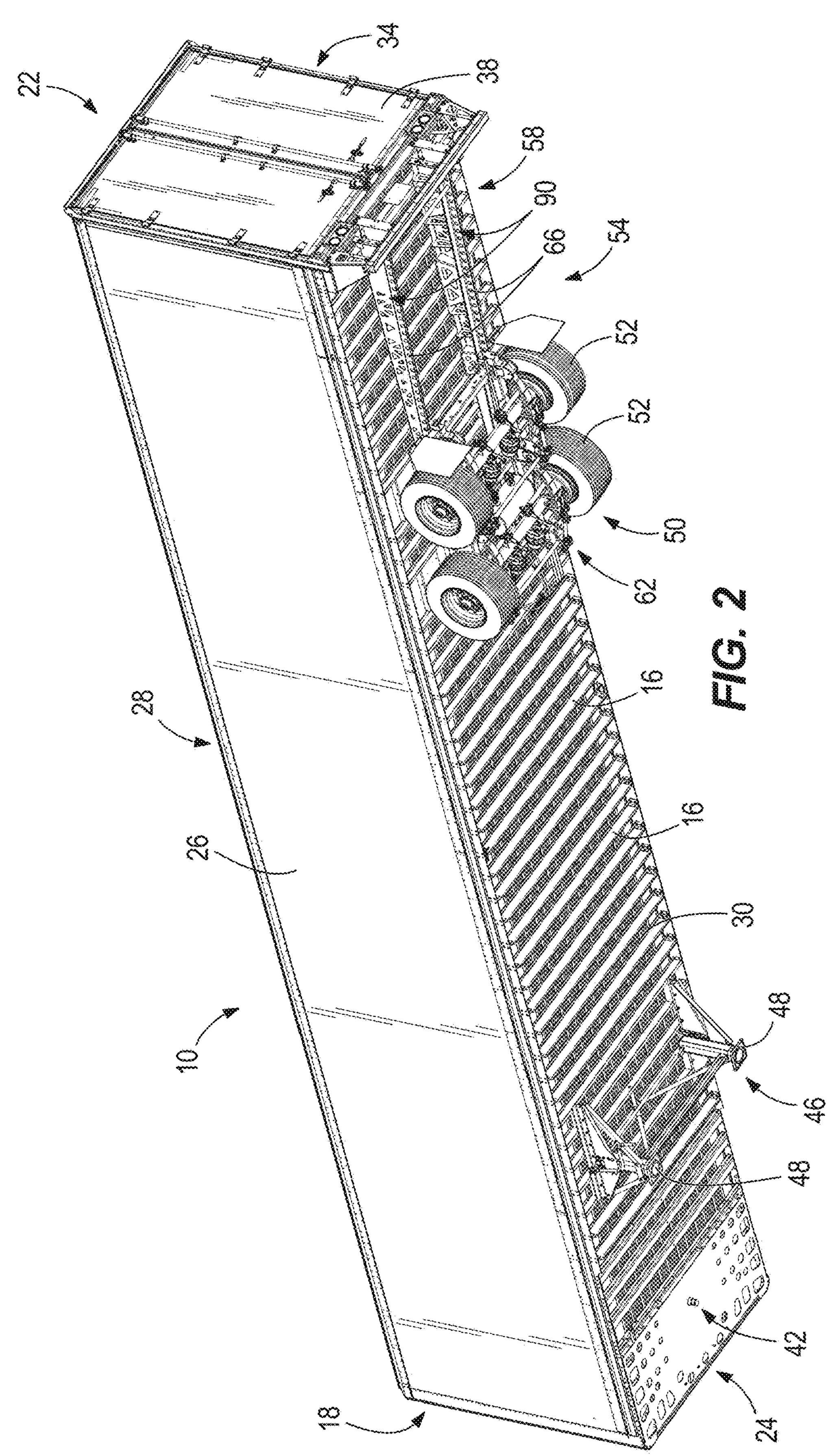
FIG. 2 is a lower perspective view of the trailer of FIG. 1.

FIGS. 1 and 2 illustrate a trailer 10, such as an enclosed over-the-road commercial transport semi-trailer or “dry van,” although the trailer may take a variety of other configurations. The trailer 10 includes an integrated substructure 12 supporting a cargo box 14 defined between a front or leading end 18 and a rear or trailing end 22. The cargo box 14 includes a front wall 24, a plurality of side walls 26, a roof 28, and a floor 30 (e.g., a working surface) that define an interior space which contains cargo when the trailer 10 is in use. The floor 30 is flat to define a generally cuboid or rectangular prism shaped cargo box 14. In other words, the floor 30 does not have a step or ramp built into it. The integrated substructure 12 includes a plurality of support beams 16 (or “cross members”) to which the floor 30 is coupled and that connect with the cargo box 14. The support beams 16 span laterally between respective lower rails along the bottoms of the side walls 26 and are oriented parallel to the floor 30. An opening 34 is positioned at the rear end 22 to allow for loading and unloading of cargo, and a door 38 is coupled to the opening 34 to selectively close the opening 34. In the illustrated embodiment, the door 38 is a two-piece door that opens outward. The trailer 10 also includes a coupler assembly 42 disposed at a bottom portion of the front end 18 of the trailer 10 to couple a tractor or other truck (not shown) to the trailer 10. A leg assembly 46 (or “landing gear”) is also disposed on the bottom portion of the front end 18 of the trailer 10. The leg assembly 46 includes a plurality of retractable legs 48 that support the front end 18 of the trailer 10 when the trailer 10 is disconnected from the tractor. Finally, a suspension assembly 50 including a plurality of wheels 52 is disposed near the rear end 22 of the trailer 10 to support the trailer 10 on a road surface. As will be described in greater detail herein, the suspension assembly 50 is position-adjustable to increase aerodynamic efficiency of the trailer 10. Fuel efficiency is one of many factors considered by companies operating over-the-road commercial transport trailers. As will be understood by one of ordinary skill in the art, increasing fuel efficiency decreases operating costs of the trailer 10. Improving the aerodynamic efficiency of the trailer 10 (e.g., reducing aerodynamic drag) is one method for increasing fuel efficiency through improved aerodynamic efficiency, and decreasing an operating height of the trailer 10 is one method for reducing aerodynamic drag. However, trailers will have a reduced cargo volume if the roof is lowered, and compatibility with existing loading docks throughout the country generally prevents lowering the floor (or “deck height”).

With reference to FIGS. 1-7, the trailer 10 of the present disclosure is height-adjustable such that a transport or cruising height of the trailer 10 is relatively lower than a docking height of the trailer 10. The reduction in ride height when at the cruising height increases the aerodynamic efficiency of the trailer 10, while the adjustability (e.g., the docking height) allows the trailer 10 to remain compatible with a standard loading dock (e.g., typically in a range of 46 to 54 inches above ground). To accomplish the change in ride height, the suspension assembly 50 is coupled to the trailer 10 via a height adjustable slider mechanism 54. The slider mechanism 54 allows the suspension assembly 50 to move between a forward or over-the-road operating position and a rearward or docking position. The slider mechanism 54 is shaped such that the ride height of the trailer 10 varies with the position of the suspension assembly 50. Referring now to FIGS. 1-4, the slider mechanism 54 includes a rail assembly 58 coupled to the integrated substructure 12 of the trailer 10, and a box assembly 62 slidably coupled to the rail assembly 58. The box assembly 62 supports the suspension assembly 50 and is movable along the rail assembly 58 to be secured in either of the forward or rearward positions. As will be described in greater detail herein, a shape of the rail assembly 58 and of the box assembly 62 allows for sliding height adjustment of the trailer 10 while maintaining the suspension assembly 50 in a level orientation.

Figure 3:
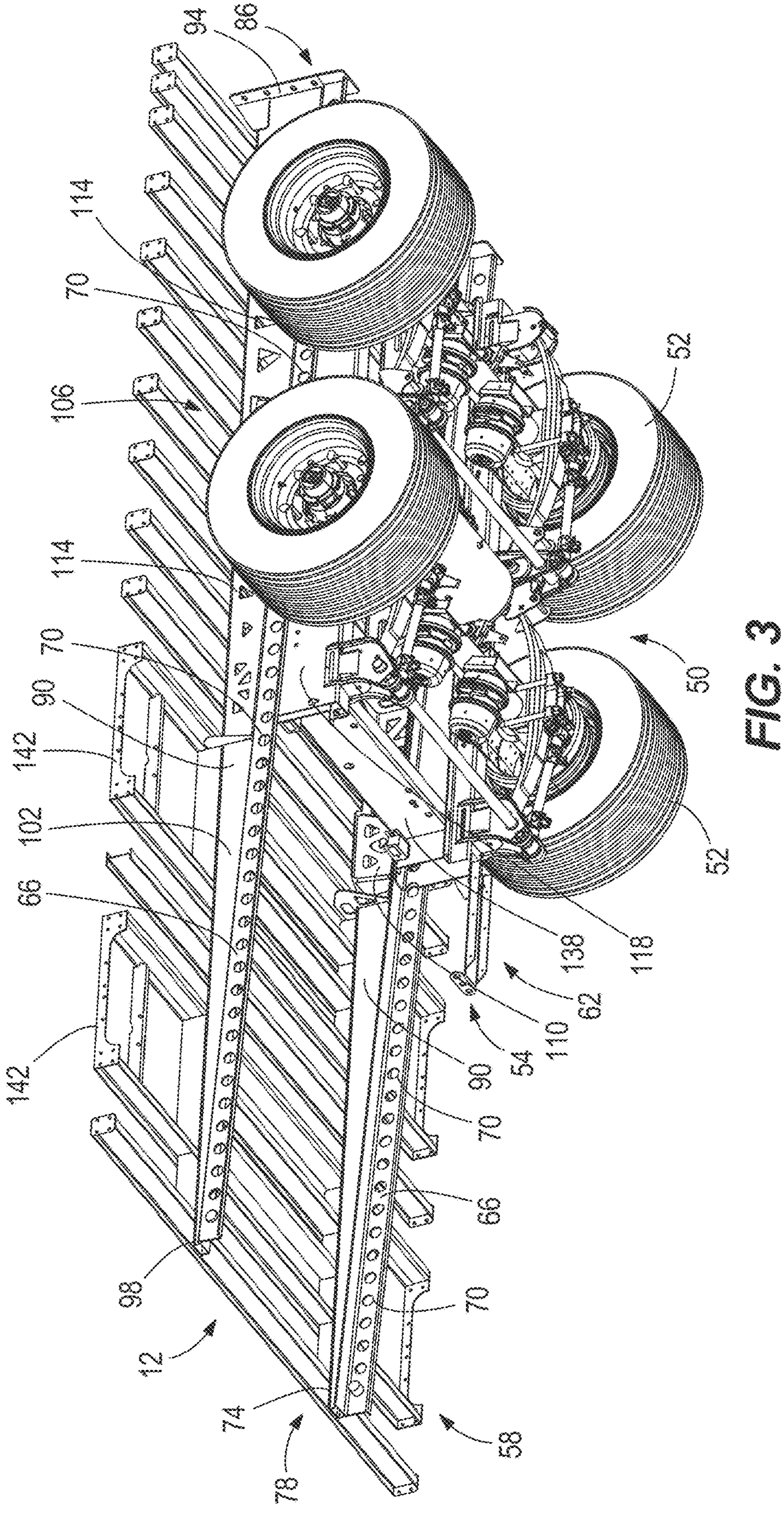
FIG. 3 is a lower perspective view of a portion of the trailer of FIG. 1
Figure 4:
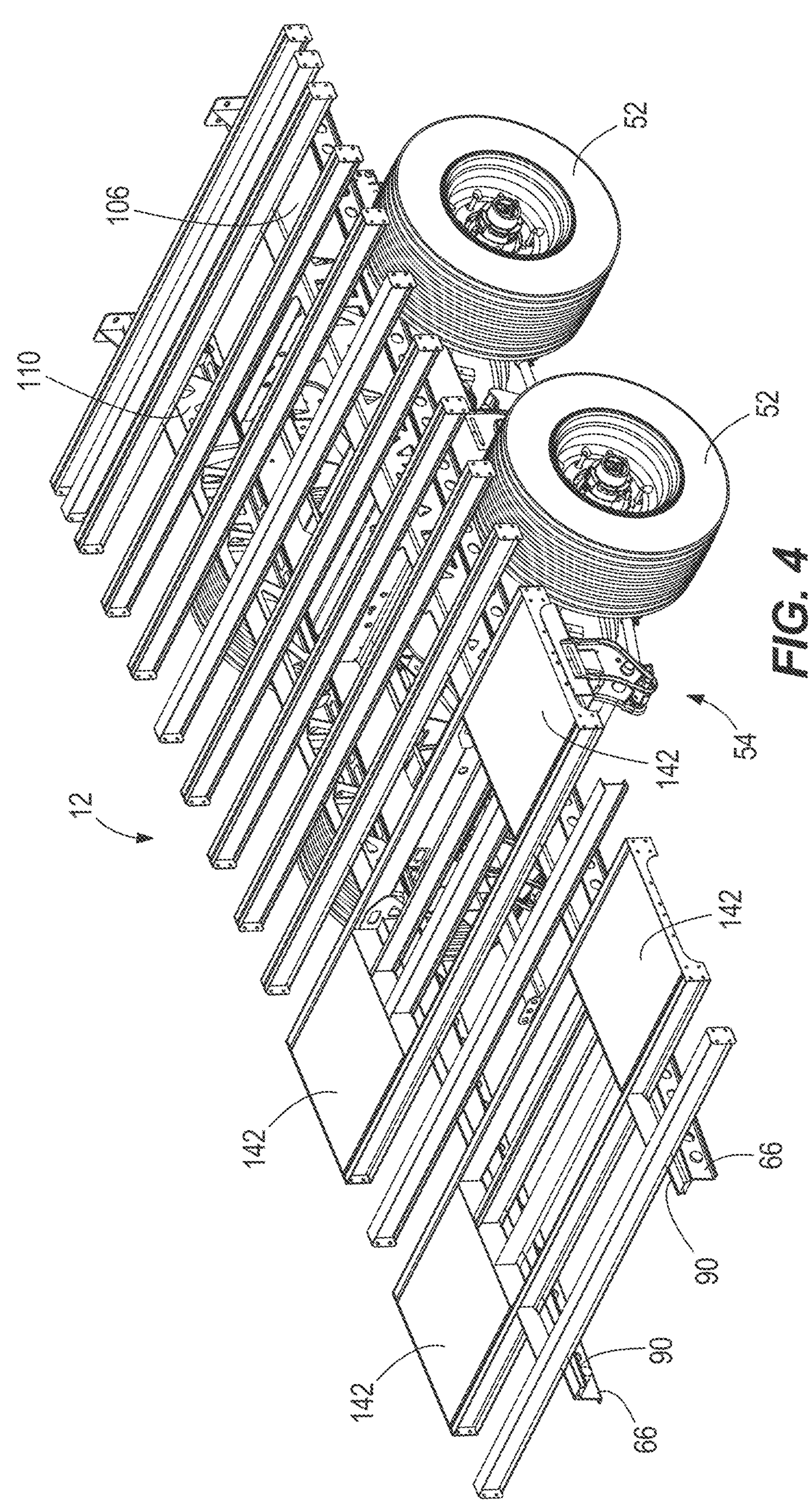
FIG. 4 is an upper perspective view of the portion of the trailer of FIG. 3.
Figure 5:
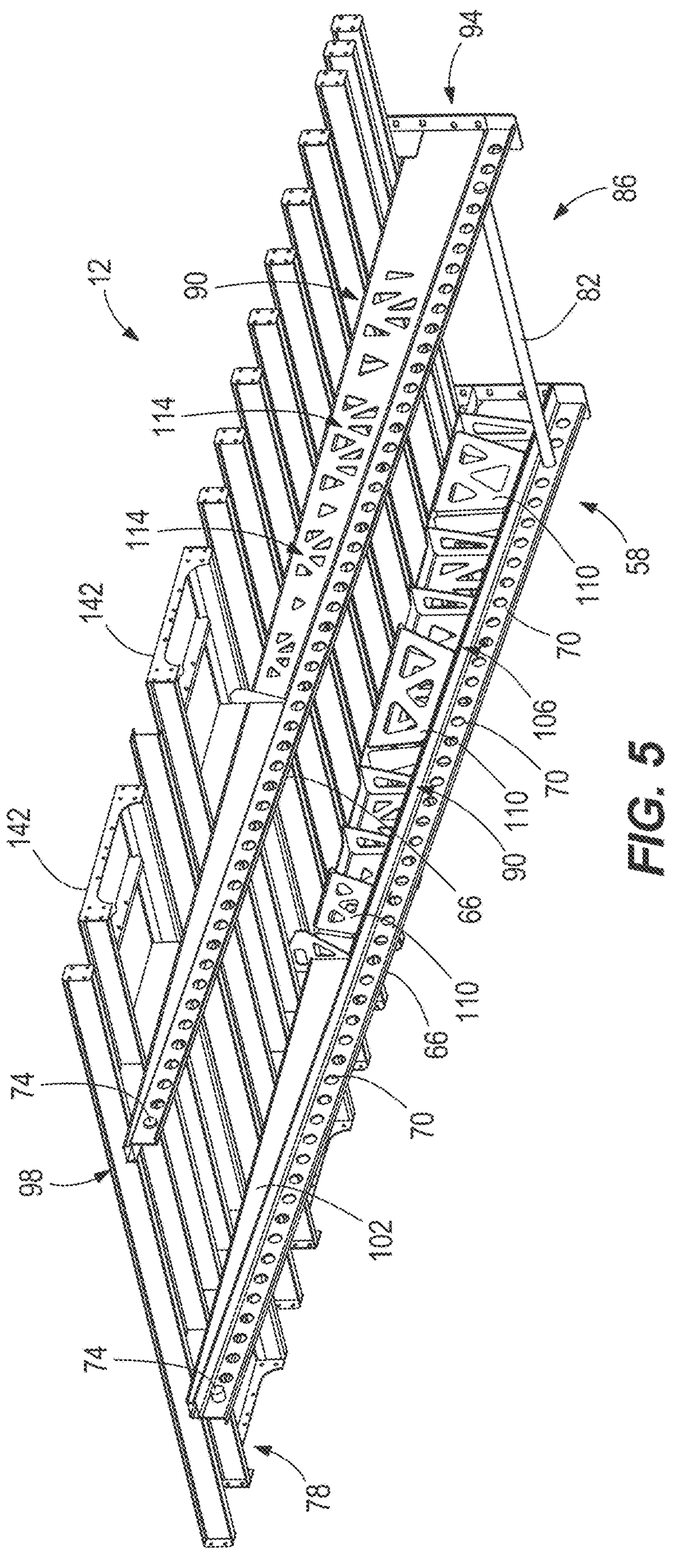
FIG. 5 is a lower perspective view of a rail assembly.

With reference to FIGS. 3-5, the rail assembly 58 includes a pair of opposed slides 66 extending along a length direction (e.g., parallel to the side walls 26) of the trailer 10. Each slide 66 includes a plurality of positioning holes 70, and the box assembly 62 includes a locking pin assembly 64 selectively engageable with the positioning holes 70 to secure the box assembly 62 relative to the rail assembly 58. In the illustrated embodiment, the locking pin assembly 64 is disposed at four corners of the box assembly 62. The locking pin assembly 64 may be a spring-biased pin or other mechanism capable of selectively securing the box assembly 62 relative to the slides 66. The plurality of holes 70 are spaced along the length of the slides 66. In some constructions, the positioning holes 70 are located only in two limit positions corresponding to the forward and rearward positions of the slider mechanism 54. In some constructions, the locking pin assembly 62 is engageable with any of the plurality of holes 70 to secure the box assembly 62 in any one of a plurality of positions corresponding with the plurality of holes 70. The positioning holes 70 may function as weight reduction as well as positioning features. In yet other embodiments, the slides 66 may include positioning holes 70 only in locations that the box assembly 62 is intended to be located, and the slides 66 may further include differently shaped holes (not shown) to lighten the slides 66 while preventing positioning of the box assembly 62 between the two limit positions. The holes 70 are positioned to locate the box assembly 62 between the forward and rearward stops 74, 82, and adjustment between the holes 70 corresponds with a change in height of the trailer 10. A forward stop 74 is positioned at a forward end 78 of the rail assembly 58, and a rearward stop 82 is positioned at a rearward end 86 of the rail assembly 58. The forward and rearward stops 74, 82 mechanically or physically limit the total range of movement of the box assembly 62 along the slides 66.

A wedge 90 is coupled to each slide 66 and to the integrated substructure 12 to couple the slides 66 to the cargo box 14, particularly the floor 30 of the cargo box 14. Each wedge 90 is similar in shape, and only one wedge 90 is described in detail herein. The wedge 90 is shaped and positioned so that a rearward end 94 of the wedge 90, relative to the trailer 10, is taller than a forward end 98 of the wedge 90. The rearward end 94 of the wedge 90 is disposed adjacent to the opening 34 of the cargo box 14 at the rear end 22 of the trailer 10. In some constructions, the change in height between the rearward and forward ends 94, 98 of the wedge 90 is between 5 and 10 inches, which corresponds to the available height adjustment of the trailer 10. In some constructions, the change in height between the rearward and forward ends 94, 98 of the wedge 90 is 6 inches. In some constructions, the deck height of the trailer 10 (e.g., a height of the floor 30) in the lowered transport configuration is below the low end of standard loading dock height (46 inches) and may be as low as 42 inches. The deck height of the trailer 10 is measured at the rear end 22. However, the wedge 90 is configured to afford enough adjustability to provide a deck height of greater than 46 inches (e.g., 48 inches or more) when in the raised docking configuration. The wedge 90 may extend a length between 100 and 300 inches and, in the illustrated embodiment, extends a length of 200 inches. A combination of the length of the wedge 90 and the change in height of the wedge 90 defines the height adjustment range of the trailer 10.

Referring to FIG. 5, the wedge 90 includes an enclosed portion 102 adjacent the forward end 98 and an open portion 106 adjacent the rearward end 94. The enclosed portion 102 is formed as a tapered U-channel and corresponds to the positioning of the suspension assembly 50 when the slider mechanism 54 is in the operating position. The open portion 106 is formed as a tapered C-channel. The open portion 106 extends rearwardly from the enclosed portion 102, and the height of the wedge 90 increases along the open portion 106. The open portion 106 includes a plurality of gussets 110 to provide structural reinforcement for the wedge 90. The gussets 110 are vertically aligned with the suspension assembly 50 when the slider mechanism 54 is in the rearward (e.g., docking) position. In the illustrated embodiment, the open portion 106, including the gussets 110, includes a plurality of holes 114 to decrease the weight of the slider mechanism 54 and thus the trailer 10 overall. In other constructions, the wedge 90 may be formed of other structures. For example, the wedge 90 may utilize two enclosed portions or may utilize two open portions.

Figure 6:
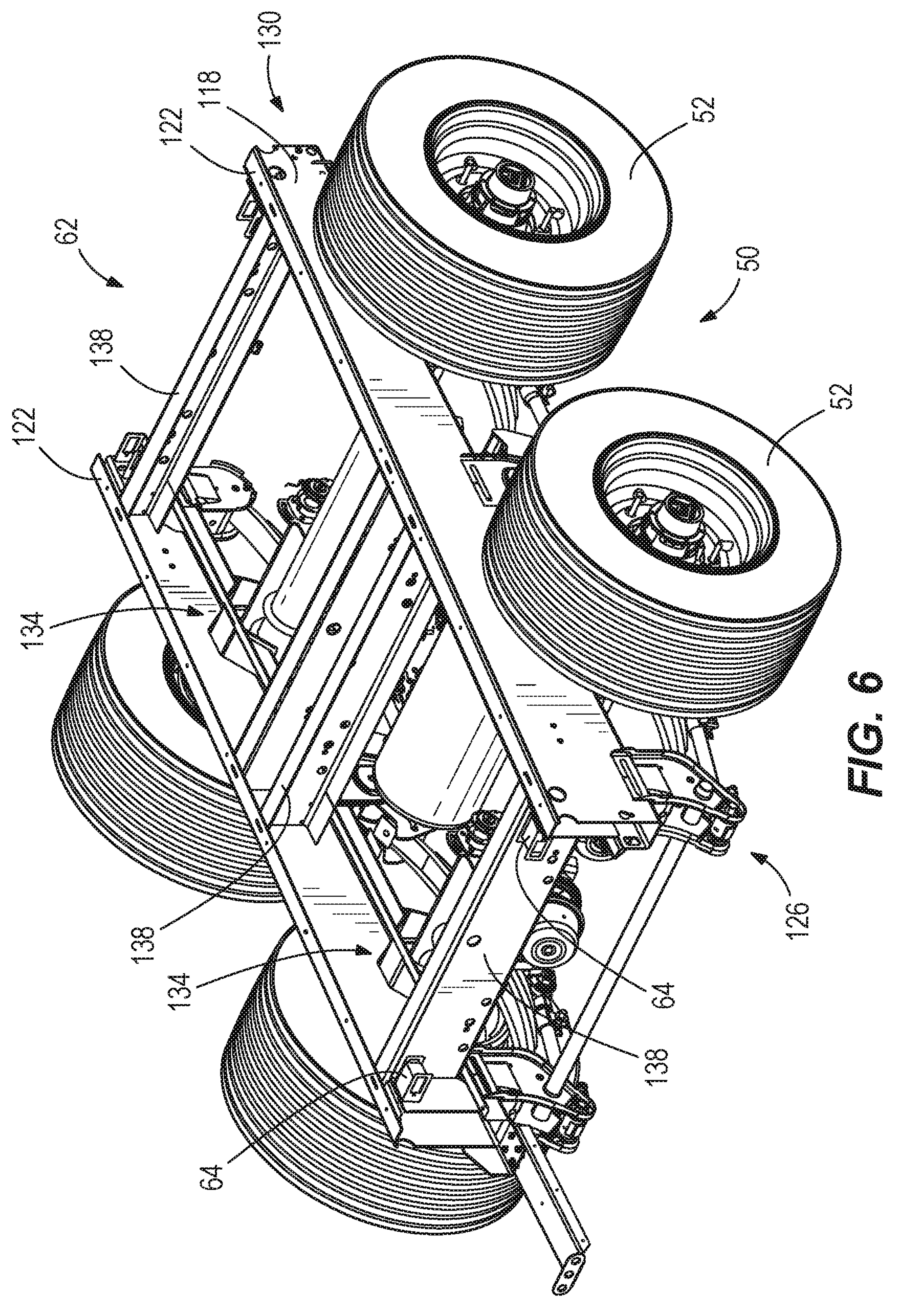
FIG. 6 is an upper perspective view of a box assembly.
Figure 7:
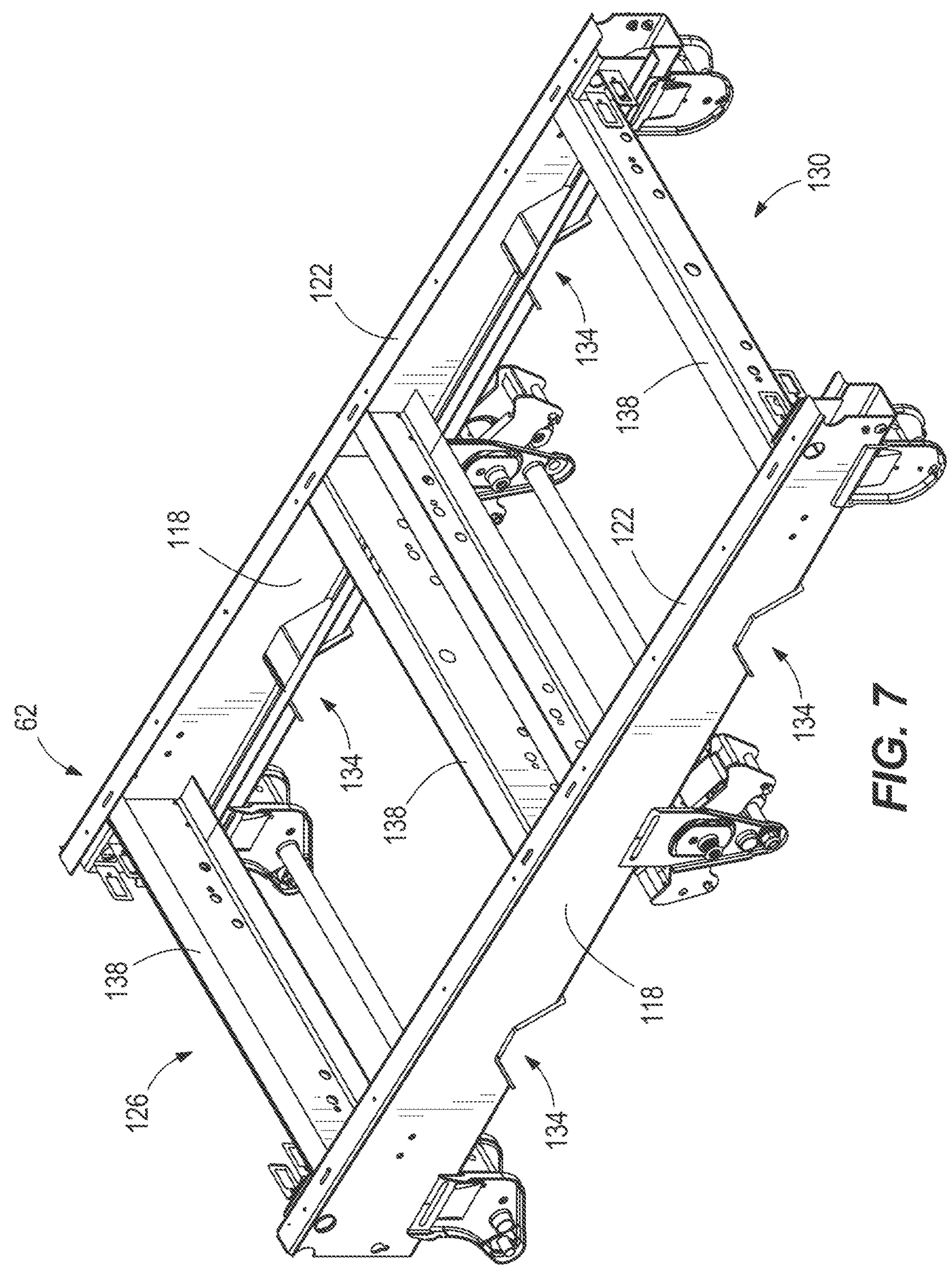
FIG. 7 is an upper perspective view of the box assembly of FIG. 6, with tires and a suspension assembly hidden for clarity.

With reference to FIGS. 3, 6, and 7, the box assembly 62 includes a frame 118 that supports the suspension assembly 50 and is slidably coupled to the rail assembly 58. The frame 118 includes a pair of opposed sliding portions 122 engageable with the slides 66 of the rail assembly 58. In the illustrated embodiment, the frame 118 of the box assembly 62 is wedge-shaped and has a slope matching the wedges 90 of the rail assembly 58. However, the frame 118 is oriented such that a forward end 126 of the frame 118 is taller than a rearward end 130 of the frame 118. Thus, the suspension assembly 50 is level during use despite the wedge shapes of the rail and box assemblies 58, 62. In some constructions, the frame 118 includes a plurality of notches 134 at a bottom side thereof to provide clearance for articulation of the suspension assembly 50. The box assembly 62 further includes a plurality of cross-members 138 spanning laterally between the opposed sides of the frame 118 that support the sliding portions 122. The plurality of cross-members 138 provide structural reinforcement for the box assembly 62, and each of the plurality of cross-members 138 has a height corresponding to the height of the frame 118 where the cross-member 138 is coupled to the frame 118. In some constructions, the frame 118 of the box assembly 62 is not sloped or wedge-shaped, and the suspension assembly 50 is positioned to accommodate for the slope of the wedges 90 (e.g., each axle is positioned at a different height).

In operation, the box assembly 62 is slidable along the rail assembly 58 to adjust the ride height of the trailer 10 by disengaging the locking pin assembly 64 and is securable relative to the rail assembly 58 by engaging the locking pin assembly 64. The ride height of the trailer 10 decreases as the box assembly 62 moves toward the forward position (e.g., the transport position), and the ride height of the trailer 10 increases as the box assembly 62 moves toward the rearward position (e.g., the docking position). The change in ride height is due to the slope of the frame 118 and the wedges 90. In some constructions, the ride height of the trailer 10 is 6 inches lower than the docking height of the trailer 10. To accomplish the change in ride height for docking, the box assembly 62 is disengaged from the positioning holes 70 to allow for movement along the slides 66. The trailer 10 is then moved forward while the box assembly 62 remains stationary. Relative movement of the box assembly 62 along the slides changes the height of the trailer 10 due to the sloped shape of the rail assembly 58. The box assembly 62 is movable between 60 and 120 inches in the forward/rearward direction (e.g., along the slides 66) and, in the illustrated embodiment, is movable 100 inches between the operating height and the docking height. The floor 30 remains relatively flat and level when at the operating height. The floor 30 may be angled (e.g., upwards toward the rear) when at the docking height and coupled to a tractor (not shown). However, the angle can be less than 1.5 degrees, or less than 1.0 degree, or less than 0.75 degree. Furthermore, the leg assembly 46 is sized such that the floor 30 may be set into a relatively flat and level orientation while at the docking height if uncoupled from the tractor.

In the illustrated embodiment, the integrated substructure 12 includes a plurality of tire plates 142 (FIGS. 3, 4) positioned above the wheels 52 when the suspension assembly 50 is in the forward position. More particularly, the support beams 16 of the integrated support structure 12 have a decreased length at locations corresponding to the wheels 52 when the suspension assembly 50 is in the forward position. In other words, the support beams 16 of the integrated substructure 12 extend laterally between the sidewalls 26. At locations corresponding to the wheels 52, however, the support beams 16 span less than the distance between the sidewalls 26. The support beams 16 that correspond to the wheels 52 are also shorter than a lateral distance between wheels 52. Thus, the support beams 16 aligned with the suspension assembly 50 when the suspension assembly 50 is in the operating position are shorter in length than the remainder of the plurality of the support beams 16 such that the support beams 16 do not interfere with the suspension assembly 50. The tire plates 142 are coupled to the integrated support structure 12 via the support beams 16 that correspond to the wheels 52 (e.g., the shorter support beams 16) and extend from the support beams 16 above the wheels 52. The tire plates 142 provide increased clearance, relative to the integrated substructure 12, for articulation of the suspension assembly 50 (e.g., up-travel or compression of the suspension assembly 50). Furthermore, in the illustrated embodiment, the trailer utilizes "super-single" tires 52 (e.g., a total of 2 on each side, in other words only two tires per axle). The tires 52 can have a relatively small diameter due to the limited amount of space between the integrated substructure 12 and the road surface during use, as compared to most commercially available trailers. The super-single tires 52 can be mounted on wheels having a diameter (e.g., 19.5 inches) that is smaller than the common diameter (e.g., 22.5 inches) for most 53-foot trailers.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention. For example, one having ordinary skill in the art will appreciate that specific features of the numerous embodiments disclosed may be mixed and matched in other ways where not specifically inhibited, even though specific illustration of such embodiments may not be exhaustively covered herein.

What is claimed is:

1. A trailer comprising:

a cargo box having a forward end, a rearward end spaced lengthwise from the forward end, and a flat floor extending between the forward end and the rearward end;

a slider mechanism coupled beneath the rearward end of the cargo box; and a suspension assembly movably coupled to the slider mechanism and configured to support the cargo box, the suspension assembly movable lengthwise along the slider mechanism between an operating position and a docking position, wherein, in response to movement of the suspension assembly along the slider mechanism to the operating position, the cargo box assumes an operating height, and in response to movement of the suspension assembly along the slider mechanism to the docking position, the cargo box assumes a docking height, and wherein the operating height is lower than the docking height.

2. The trailer of claim 1, wherein the slider mechanism includes a plurality of positioning holes configured to selectively secure the suspension assembly in a desired position along the slider mechanism.

3. The trailer of claim 2, wherein the slider mechanism includes a forward stop disposed forward of the plurality of positioning holes and a rearward stop disposed rearward of the plurality of positioning holes, and wherein the forward stop and the rearward stop are configured to limit movement of the suspension assembly along the slider mechanism.

4. The trailer of claim 1, wherein the cargo box includes an integrated substructure to which the slider mechanism is coupled, wherein the integrated substructure includes a plurality of support beams extending widthwise and configured to support the floor, and wherein support beams of the plurality of support beams at the operating position of the suspension assembly are shorter support beams that have a length measured widthwise across the cargo box that is shorter than a length of a remainder of the plurality of the support beams measured widthwise across the cargo box.

5. The trailer of claim 4, further comprising a plurality of tire plates coupled to the shorter support beams of the integrated substructure to be positioned above the suspension assembly when the suspension assembly is in the operating position.

6. The trailer of claim 1, wherein the docking height of the trailer is measured as a height of the floor when the suspension assembly is in the docking position and is approximately 46 inches.

7. The trailer of claim 6, wherein the operating height of the trailer is measured as a height of the floor when the suspension assembly is in the operating position and is approximately 42 inches.

8. The trailer of claim 1, wherein:

the slider mechanism includes a rail assembly coupled to and extending along the cargo box and a box assembly supporting the suspension assembly and slidably coupled to the rail assembly, the rail assembly defines a wedge, and the box assembly includes a frame that defines a wedge matching the wedge of the rail assembly.

9. The trailer of claim 8, wherein the frame of the box assembly includes a plurality of notches configured to provide clearance for articulation of the suspension assembly.

10. The trailer of claim 8, wherein the wedge of the rail assembly includes a forward portion formed as an enclosed portion and a rearward portion formed as an open portion.

11. The trailer of claim 10, wherein the rearward portion includes a plurality of gussets configured to structurally reinforce the rearward portion.

12. The trailer of claim 10, wherein the rearward portion includes a plurality of holes configured to decrease a weight of the rearward portion of the wedge of the rail assembly.

13. The trailer of claim 1, wherein the floor is maintained level when the cargo box is at the operating height.

14. The trailer of claim 1, further comprising a leg assembly configured to support the forward end of the cargo box when not coupled to a tractor, wherein the leg assembly is height adjustable and configured to provide the floor with a level orientation when at the docking height.

15. The trailer of claim 1, wherein the suspension assembly has a range of travel between 60 and 120 inches along the slider mechanism between the operating position and the docking position.

16. The trailer of claim 15, wherein the range of travel of the suspension assembly is 100 inches.

* * * * *